United States Patent [19]

van Vuuren

[11] Patent Number: 5,857,527
[45] Date of Patent: Jan. 12, 1999

[54] APPARATUS FOR THE CUTTING OF ONE OR MORE GRASS SODS AND A METHOD FOR THE STACKING THEREOF

[75] Inventor: Johannes van Vuuren, Harmelen, Netherlands

[73] Assignee: Harmelerwaard Patents B.V., Harmelen, Netherlands

[21] Appl. No.: 585,632

[22] Filed: Jan. 16, 1996

[30] Foreign Application Priority Data

Jul. 12, 1993 [NL] Netherlands ........................... 9301218

[51] Int. Cl.⁶ .................................................. A01B 45/04
[52] U.S. Cl. .............................. 172/19; 172/33; 414/911; 280/486
[58] Field of Search .................................. 172/19, 20, 33, 172/63, 67, 167, 667, 668, 459; 414/911; 280/486, 492, 411.1

[56] References Cited

U.S. PATENT DOCUMENTS

| Re. 34,827 | 1/1995 | Dover et al. ............................... 172/19 |
|---|---|---|
| 3,034,586 | 5/1962 | Ditter ........................................ 172/19 |
| 3,235,011 | 2/1966 | Pasinski et al. ........................... 172/19 |
| 3,429,377 | 2/1969 | Nunes, Jr. ................................. 172/19 |
| 3,468,381 | 9/1969 | Olson ........................................ 172/19 |
| 3,664,432 | 5/1972 | Nunes, Jr. . |  |
| 3,672,452 | 6/1972 | Miner ....................................... 172/19 |
| 3,887,013 | 6/1975 | Helberg ..................................... 172/20 |
| 4,063,384 | 12/1977 | Warren et al. ......................... 172/20 X |
| 4,162,709 | 7/1979 | Wilson ...................................... 172/20 |
| 4,162,726 | 7/1979 | Hudson et al. ....................... 172/20 X |
| 4,294,316 | 10/1981 | Hedley et al. . |  |
| 4,408,666 | 10/1983 | Lawson .................................... 172/19 |
| 4,828,040 | 5/1989 | Schumacher .......................... 172/20 X |
| 4,944,352 | 7/1990 | Brouwer et al. ......................... 172/19 |
| 5,064,000 | 11/1991 | Dover et al. . |  |

FOREIGN PATENT DOCUMENTS 0221745  5/1987  European Pat. Off. .

*Primary Examiner*—Terry Lee Melius
*Assistant Examiner*—Victor Batson
*Attorney, Agent, or Firm*—Webb Ziesenheim Bruening Logsdon Orkin & Hanson, P.C.

[57] ABSTRACT

An apparatus for cutting grass sods out of grass land and for stacking or rolling up into a predetermined amount of stacks or rolls of one or more grass sods. The apparatus includes a frame provided with two or more wheels suspended thereon, a cutting head suspended in the frame for cutting under the grass sods, a first conveyor which is mounted on the frame in driving direction as seen from behind the cutting head and which repeatedly transports the grass sods from the cutting head in an upwards direction, a second conveyor mounted on the frame in a driving direction as seen from behind the first conveyor and whereof at least one part is moveable with respect to the first conveyor and/or the other part to the second conveyor.

16 Claims, 8 Drawing Sheets

APPARATUS FOR THE CUTTING OF ONE OR MORE GRASS SODS AND A METHOD FOR THE STACKING THEREOF

CROSS REFERENCE TO RELATED APPLICATION

This application is a continuation-in-part of International Patent Application No. PCT/NL94/00159, filed 12 Jul. 1994, and published 26 Jan. 1995, as International Publication No. WO 95/02317, claiming priority to Netherlands Application No. 93.01218, filed 12 Jul. 1993 and designating inter alia the United States of America.

BACKGROUND OF THE INVENTION

For various reasons, it has become fashionable to cut increasingly broader grass sods, for instance about 48 inches (about 120 cm) or more than about 40 to 60 cm, out of grass land with the help of cutting means. These reasons mostly concern the quicker laying down of large grass surface areas, such as those needed for sports fields, golf courses, large lawns and the like, as well as the greater possibilities for laying down of large rolls of grass with the help of machines.

In European patent application EP-A-0178081 and the European patent application published under the number EP-A-0420689, devices are described for laying down broad grass sods (in the form of so-called big rolls).

In the European patent published under the number EP-A-0221745, a driven vehicle is described for making such big rolls from grass sods. This device is however only suitable for this and does not allow for the cutting and stacking of grass sods in any other way.

SUMMARY OF THE INVENTION

The present invention provides a method for cutting out and stacking up of one or more grass sods wherein the first part of a cut out grass sod is placed on a holder therefor. Thereafter the grass sod is folded up and a second part of the grass sod is placed on the first part.

According to this first aspect of the invention, a method is provided which makes it possible to cut out and stack up grass sods in such a manner that a similar grass sod can be pulled off of the stacked up grass sods with a relatively simple help means or by hand, and then placed at the desired place.

Furthermore, the present invention provides an apparatus for cutting grass sods out of grass land and for stacking or rolling up one or more grass sods into a predetermined amount of stacks or rolls, and may comprise:

- a frame provided with two or more wheels suspended thereon,
- a cutting head suspended in the frame for cutting under the grass sods,
- a first conveyor mounted on the frame behind the cutting head and which repeatedly transports the grass sods from the cutting head in an upwards direction,
- a second conveyor mounted on the frame behind the first conveyor, with the second conveyor comprising a fixed part and a moveable part.

The base concept of the present invention aims to provide a universal grass sod cutting apparatus which can process big rolls as well as stacked grass sods in other ways. Due to the working costs and level of training needed for personnel working on the land, the automatic laying down (and therefore also the manufacturing of) large rolls of grass sods are desired.

BRIEF DESCRIPTION OF THE DRAWINGS

Further advantages, characteristics and details of the present invention will become clear with respect to the following description of the preferred embodiments thereof, with reference to the accompanying drawings which show.

DESCRIPTION OF THE PREFERRED EMBODIMENTS

An apparatus (FIG. 1) according to the present invention comprises a frame 2 which is provided with a bar 3 on the front side to be secured to a draw bar eye 4 of a puller (not shown). A cutting head 5 is secured in the frame 2. The cutting head 5 is preferably changeable and is suspended moveably in the frame 2, so that this cutting head 5 can follow irregularities in the ground surface level and can thus cut out grass sods of substantially uniform thickness. Details of a cutting head for cutting out grass sods are described in U.S. Pat. No. 4,892,152 which is herein incorporated by reference. Although the cutting head 5 is capable of cutting out grass sods of varying breadth, for example, about 48 inches, 120 cm or 1 meter, one or more narrower strips of grass can also be cut out with another cutting head. For cutting out grass sods of conventional breadth, three knives are suspended next to each other in the cutting head and the knives are preferably moveable relative to each other. Suspension of the knives is preferably done such that with three knives next to each other, an equal force is exerted on the knives by the weight of the holder or the cutting head frame.

Figure 1:
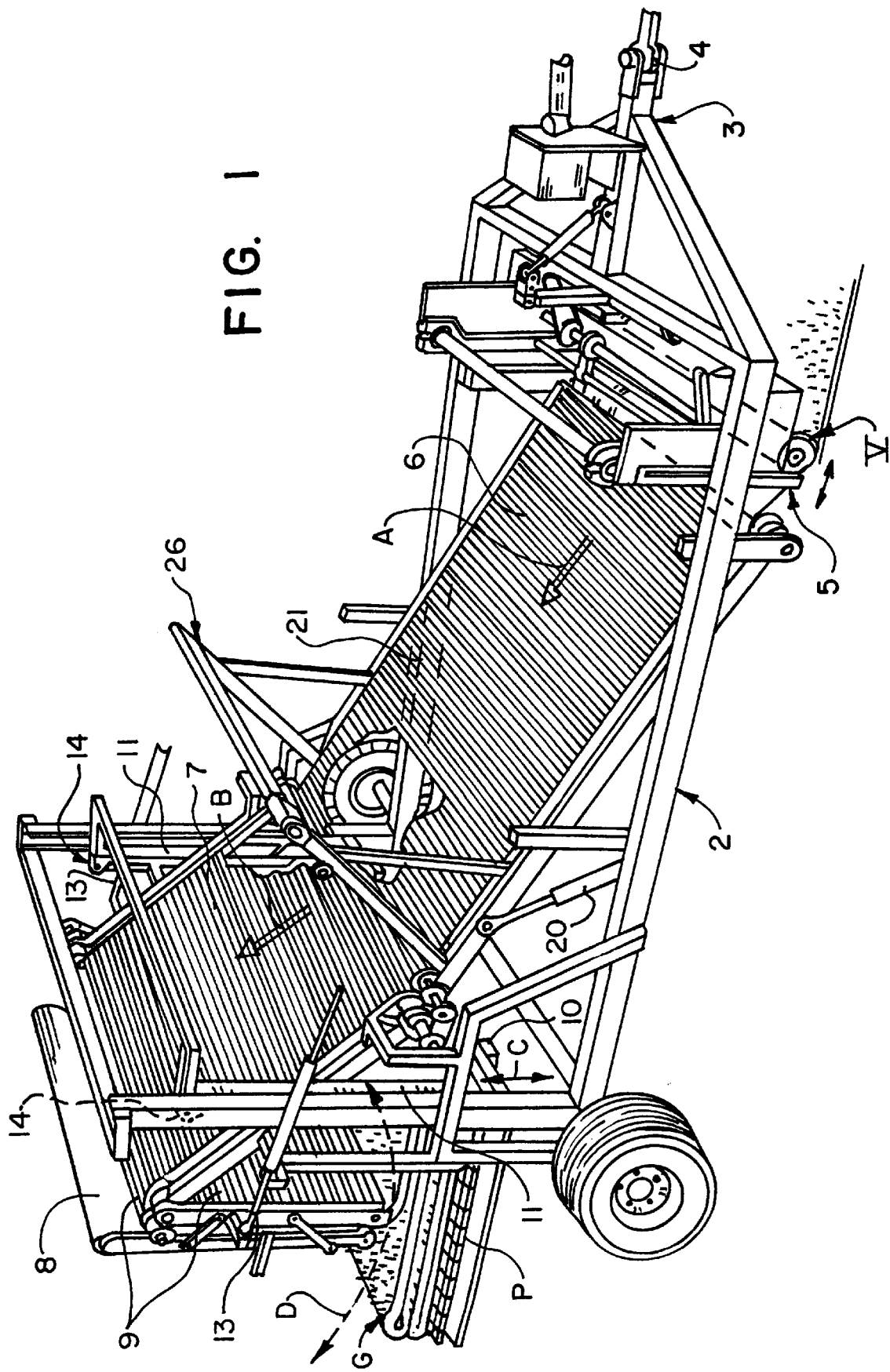
FIG. 1 is a perspective view of a preferred embodiment of the apparatus according to the present invention.

In the frame 2, a first conveyor 6 is secured behind the cutting head 5 for transporting the grass sods upwards from the cutting head (see arrow A in FIG. 1). A second conveyor 7 is also secured on the frame 2 which, in the position shown in FIGS. 1 and 2, abuts the first conveyor 6 and transports the grass sods further in an upwards direction (arrow B). Thereafter, these grass sods are transported downwards between part conveyors 8 and 9, which both form part of the second conveyor 7, and are then stacked on a pallet P. The pallet P is carried on a fork 10 which is secured to a frame part 11, which as shown by arrow C, is moveable in an upwards and downwards direction in accordance with the height of the grass sods G already stacked. The part conveyors 8 and 9 are moveable, as depicted by broken arrow D, by means of a hydraulically operable plunger 13 so that the grass sods are stacked onto pallet P in a zig-zag manner. A grass sod stacked in such a zig-zag manner can be lain out by simply pulling on the upperside thereof, if the strength of the grass sod allows this.

In a further not shown manner, an approaching sensor may be mounted on the underside of one of the part conveyors 8, 9 which is workably connected with a schematically shown device 14 for lowering the fork 10 and thereby the pallet P with regularity. Thus, the distance between the underside of the part conveyors 8, 9 and the upper side of the grass sod G remains roughly constant.

As can be appreciated from FIGS. 1–4, the conveying speed of the first and second conveyors 6, 7 as well as the part conveyors 8, 9 which make up part of second conveyor 7, are synchronized with each other.

Figure 3:
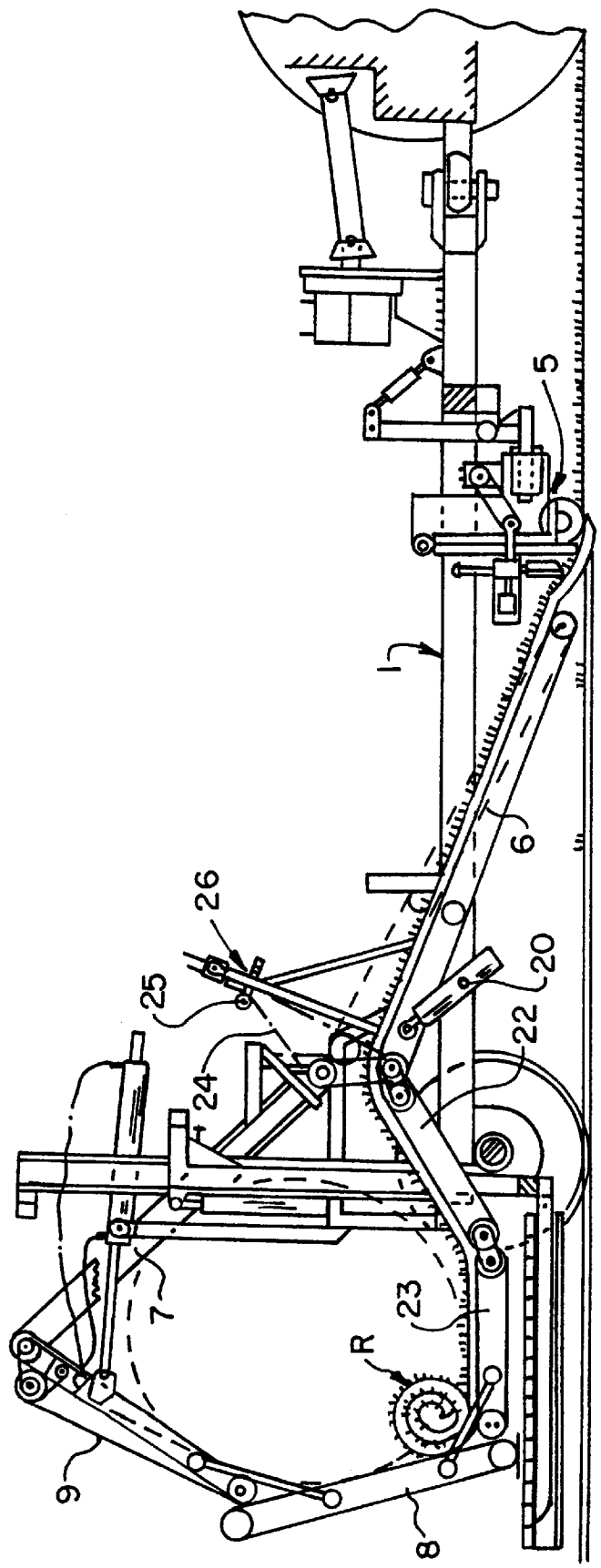
FIG. 3 is a side view of the apparatus from FIG. 1 in a second working position.

In the position shown in FIG. 3, the first conveyor 6 is brought into a low position by means of hydraulic cylinders 20, 21. Two auxiliary conveyors 22, 23 are located behind the first conveyor 6 as seen in the transporting direction of the first conveyor 6. In this position of the apparatus, the first conveyor 6 and the auxiliary conveyors 22 and 23 belonging thereto work together with the part conveyors 8 and 9 which belong to the second conveyor 7. FIG. 3 schematically shows how with the aid of a driving belt 24, the length of which is adjustable by means of an adjusting member 25 secured to the frame 26, the synchronization of the driving of the conveyors takes place. The part conveyors 8 and 9 are driven via the driving belt 24 and the fixed head part of the second conveyor 7 while the auxiliary conveyors 22 and 23 are driven via driving belt 24 and the head part of the first conveyor 6.

Figure 2:
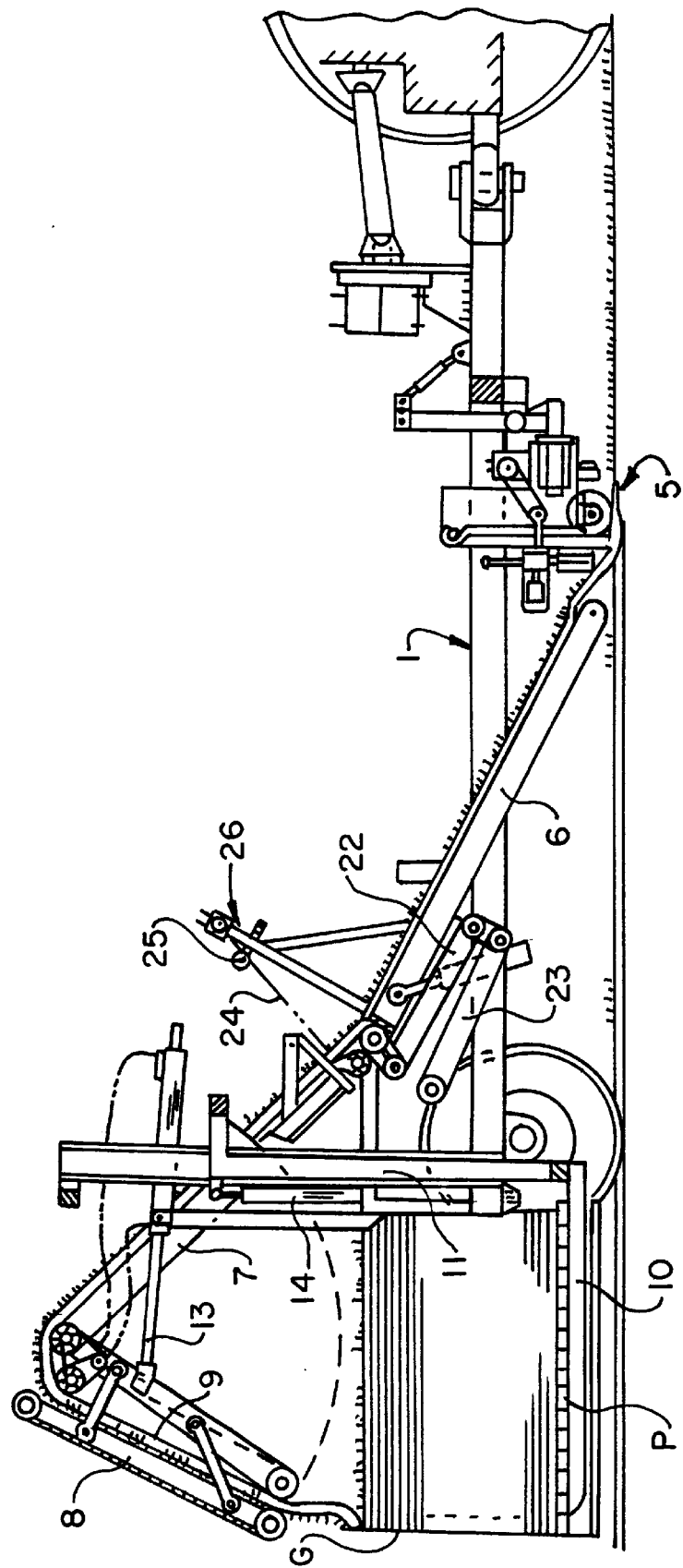
FIG. 2 is a side view of the apparatus from FIG. 1 in a first working position.

In FIG. 2, the auxiliary conveyors 22, 23 are respectively folded away under the main part of the first conveyor 6 and the driving belt 24 is so adjusted, with the aid of the adjusting element 25, that synchronization again takes place between the first and second conveyors 6, 7, respectively.

Figure 4:
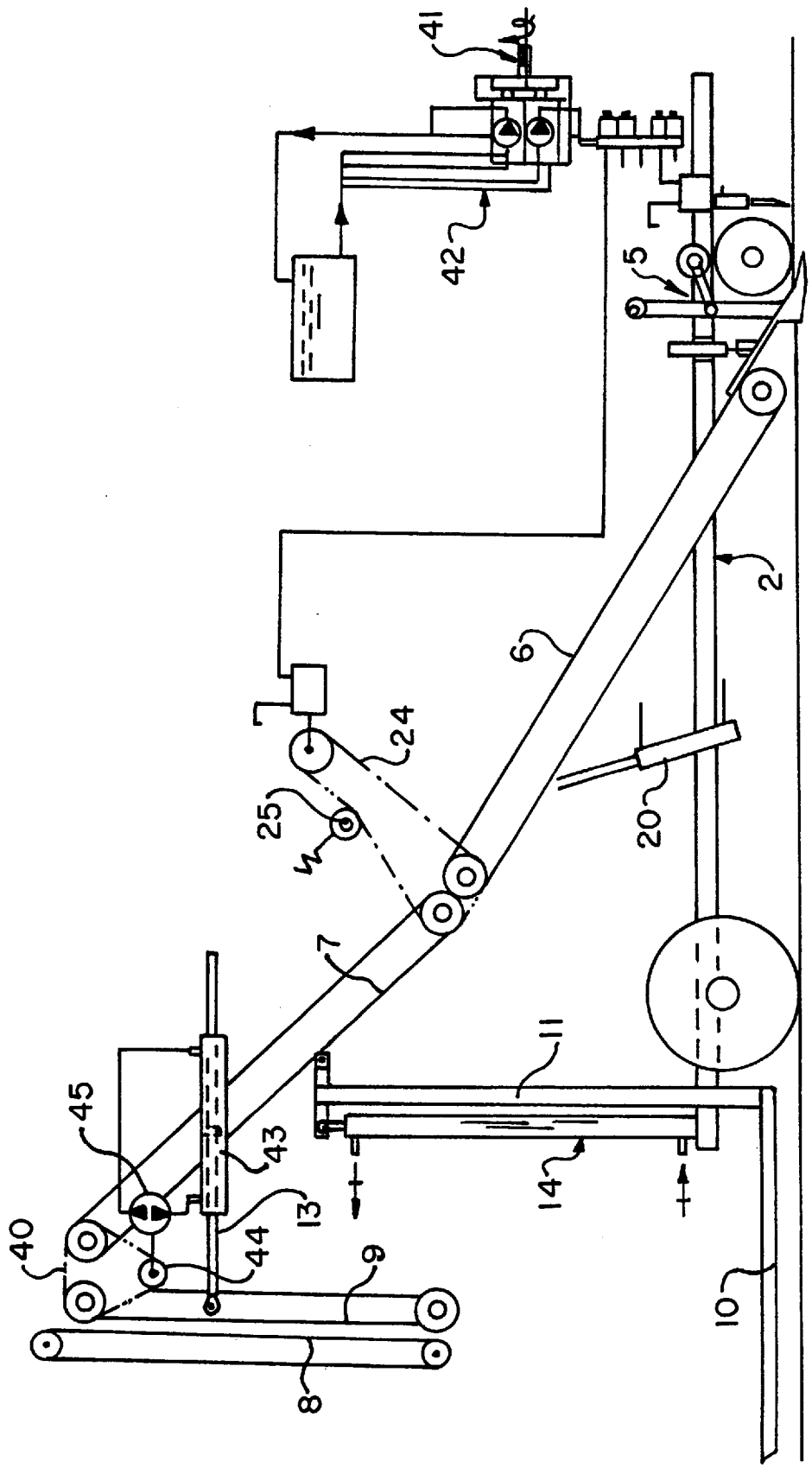
FIG. 4 is a schematic of a hydraulic system for the apparatus from FIG. 1.

It is also shown in FIG. 4 that the driving of the first conveyor 6 and second conveyor 7 is synchronized by means of the driving belt 24. A schematically depicted driving belt 40 is also seen in FIG. 4 which guarantees the synchronization of the part conveyors 8 and 9 with the first conveyor 6. For hydraulic steering of the diverse drivers, a hydraulic system is preferably used, which preferably makes use of a power take off 41 of a further not shown puller.

In a conventional manner, a hydraulic unit 42 is provided with which the driving of the diverse driving belts and other hydraulic cylinders depicted in FIG. 4 is accomplished. The to and fro movement of the part conveyors 8 and 9 via the plunger 13 and the associated cylinder 43 is of particular importance. In the shown example of the embodiment, a pulley 44, along which the driving belt 40 is guided, is workably coupled with a hydraulic operating member 45 for operating the plunger 13 via the hydraulic cylinder 43.

Figure 5:
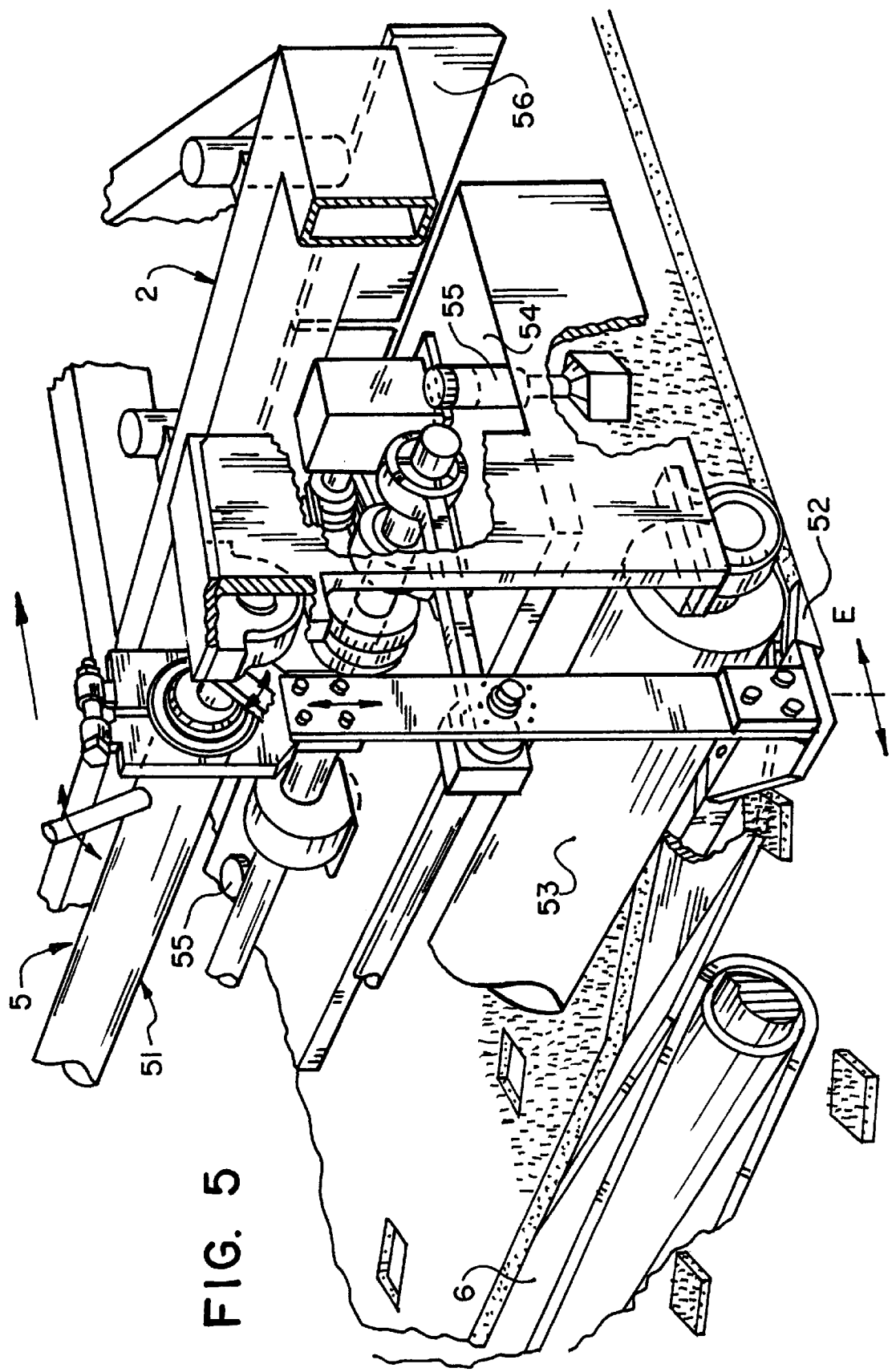
FIG. 5 is a perspective view of detail 5 in FIG. 1.

The cutting head 5 is shown in more detail in FIG. 5 as it is placed in the frame 2 in the embodiments shown in FIGS. 1–4. This cutting head 5 is, apart from the large breadth thereof for cutting out of the earlier mentioned breadths of about 120 cm, in many ways similar to the cutting head shown and described in the earlier mentioned U.S. Pat. No. 4,892,152. With the aid of adjusting means schematically depicted by 51, a knife 52 is provided which, as shown by arrow E, is adjustable with respect to a roll 53 to adjust the thickness of the sod to be cut. On the front side of the frame, a vertically moveable knife 56 is mounted which determines the length of grass sod to be cut during operation. It is also conceivable to place a cutting-off knife near to the first conveyor 6 or second conveyor 7 for cutting off of the sod length.

Punch elements 55 are placed in front of the roll 53 and the knife 52 on the frame part 54. The punch elements 55 punch a relatively small part of the grass land into the ground before a grass sod is cut out of the grass land. Under certain climatological circumstances, it is sufficient that such relatively small parts of the grass land remain behind so that the grass land does not need to be further sown. It is also conceivable under these climatological circumstances and suitable grass sorts therefor, to leave behind small grass strips in the grass land wherefrom a complete grass land then grows.

Concerning the cutting head 5, it is important to note that this is easily interchangeable and that it can thus just as readily with the shown and described preferred embodiment of the apparatus according to the present invention, cut out narrower strips of grass as required and transport these via the first conveyor of the cutting heads up and away. It is preferable then that each knife, for the cutting out of the narrower grass sods, is suspended independently in the cutting head so that each cutting head can follow any irregularities in the level of the grass land and cut out sods of substantially consistent thickness.

Because the second conveyor 7 is also easily interchangeably secured in the frame, it is for both broader and narrower grass strips possible to determine the manner of stacking onto the pallets according to the wishes of the customer. The narrow or broad grass strips can, as desired, be cut out with a determined length by means of a vertically moveable knife such as the knife 56 in FIG. 5. The second conveyor 7 can be made up of two or three conveyors mounted above each other which are successively provided with a grass sod, due to the fact that the first conveyor 6 is moved up and down to a certain extent, whereafter each of the part conveyors 8, 9 can bring a smaller or bigger grass sod, whether or not folded, onto a pallet.

Figure 6:
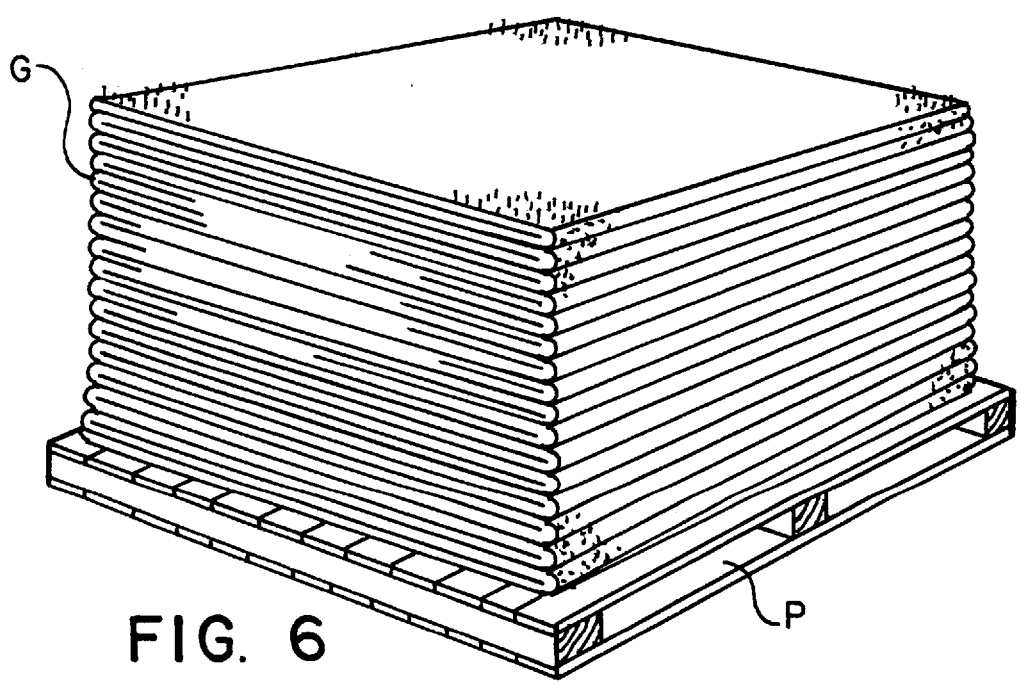
FIG. 6 is a perspective view of stacked up grass sods formed by the apparatus shown in FIG. 2.
Figure 8:
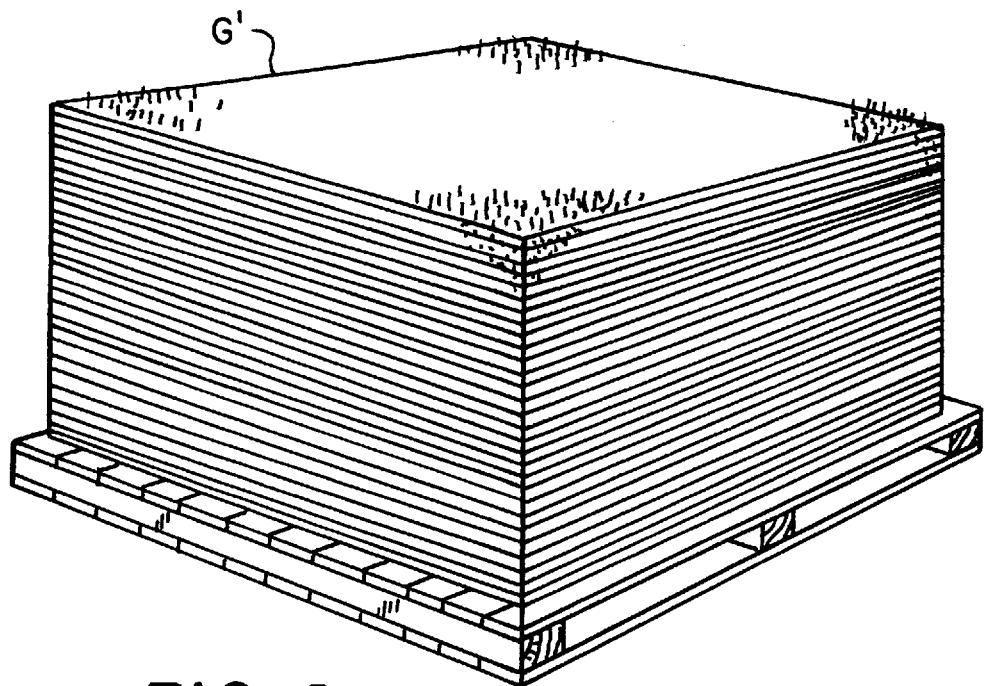
FIG. 8 is a perspective view of one of the other possibilities for a stacking of relatively large grass sods.

In FIG. 6 a grass sod G, folded in a zig-zag manner, is shown on a pallet P. This is the final product of the preferred embodiment shown in FIG. 1 of the present invention in the position as shown in FIGS. 1 and 2. A large roll 70 is obtained with the apparatus according to the present invention in the position as shown in FIG. 3. In FIG. 8, cut out grass sods G' with a breadth of about 120 cm are repeatedly stacked onto each other.

Figure 7:
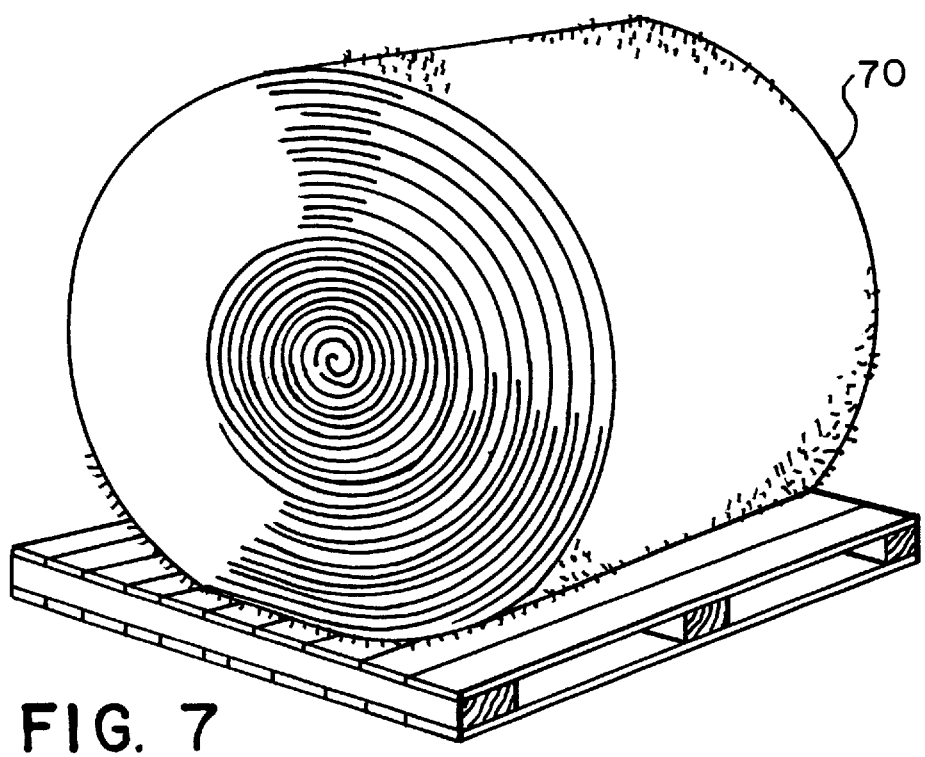
FIG. 7 is a perspective view of stacked up grass sods formed by the apparatus shown in FIG. 3.

Depending on the embodiment of the second conveyor 7 and cutting head 5, a large number of stacking methods are possible. A number of the more important ones are mentioned below:

the continuous so called "big slab", shown in FIG. 6, the so called "big roll", shown in FIG. 7, the loose slabs shown in FIG. 8, a stack of slabs, with each slab folded in half and resting on top of another folded slab, a stack of slabs, folded in half where the fold is positioned between the sides of the folded slabs, narrower grass strips stacked up next to each other or repeatedly somewhat shifted in transverse direction with respect to the driving direction in order to obtain a better connection in the stacking as shown, for example, in U.S. Pat. No. 4,294,316 which is herein incorporated by reference.

It is also possible to wind the grass sods or slabs into a roll so that the grassy sides always lie on each other and thus the undersides also lie on each other.

It also appears that with certain grass sorts, the making of big rolls or large stacks of grass sods encompasses problems because of the weakness of such grass sorts. It is conceivable that during the rolling up of the grass sods, or after a few layers in the stacking, a mesh of synthetic material can be supplied therebetween which further improves the connection. Such a synthetic mesh can then be brought into the stacking of a roll from the rear side or under the first or second conveyor. It is expected that it will be possible, with the above described apparatus for cutting and rolling up of large rolls, to leave a pipe or rod in the center of the roll because this is not needed for rolling up, when the strength of the grass sod allows this. On the other hand, the required strength and connection can be obtained by the taking up of mesh on the outer side or possibly between the layers of grass in the roll.

It will be clear that the cutting apparatus according to the present invention makes possible a great deal of new possibilities concerning the desired supply of grass sods. Deciding factors for the requirements of a grass sod grower concern the working costs for laying down of the grass sods, the strength of the grass sods, which apart form the sort of sown grass, is also related to the climatological circumstances as well as the requirements of the customers which can also be based on a certain ingrained practice.

From the above it will be clear that the requested rights are in no way limited by the depicted and described preferred embodiments of the present invention. The requested rights are determined by the here following claims.

Concerning this, it is of importance to note that with a cutting head and a conveyor for a broad grass sod, stacking and/or rolling up mechanisms can be coupled thereto in many ways. For example, two sod rolling conveyors, taking a V-shaped form, may be placed on the apparatus behind the second conveyor 7 such that a large roll of sod can be rolled between the two sod rolling conveyors. A transport conveyor may be located above the sod rolling conveyors for letting the roll easily roll out. The V-shaped sod rolling conveyors are preferably set up in such a way that the large roll can be rolled up between the V-shaped sod rolling conveyors, which are moveable thereto and which may be moved under the rolled up grass. Such an apparatus does not need to be suitable for stacking of to and fro moving grass sods, also called big slabs.

In a similar manner, it is conceivable to provide an apparatus which is only suitable for the stacking of broad strips of grass in a to and fro manner, or in the form of so called big slabs. The first and second conveyors can then be set up as one passing through conveyor.

Due to the interchanging of the cutting head 5, such an apparatus can be easily made suitable for cutting out of narrow grass sods according to the requirements of the user of the apparatus. An important new aspect here is that with narrower grass sods, a strip of grass can be left behind on the grass land. Thus, under certain climatological circumstances, the sowing of new grass need not be carried out because new grass land can form from the grass strip left behind. With narrow grass strips the conveyor can be provided with discs or baffle plates in order to bring the narrow grass strips into the desired mutual positions on the broad conveyor.

Figure 9:
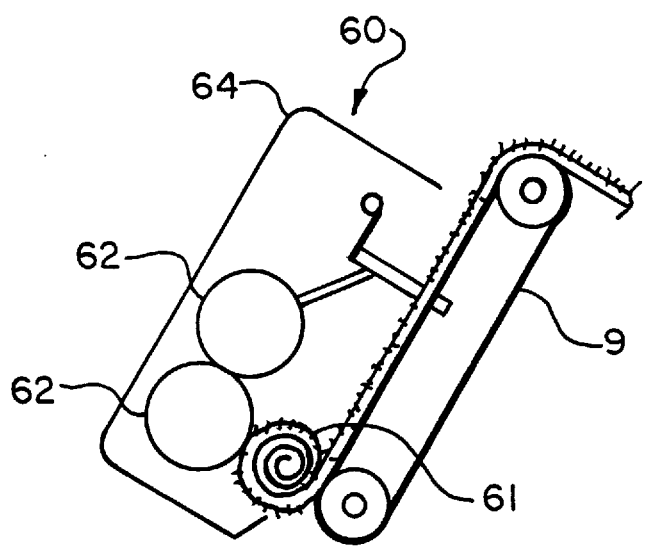
FIG. 9 is a schematic view of a device for use with the apparatus shown in FIG. 2 to form sod rolls.

As shown in FIG. 9, if relatively narrow grass strips are cut out, e.g. having a width of about one-third of the total breadth of the machine, it is also possible to exchange the part conveyor 8 (FIGS. 1, 2, 3 and 4) with a device 60 for rolling up such relatively narrow strips into small rolls 61 of grass, whereby the apparatus according to the present invention can also be made suitable for cutting out, handling and stacking of conventional small rolls of grass. The device 60 includes a plurality of counter rollers 62 spaced from the part conveyor 9 and carried in an enclosure 64. Such devices for rolling up sod are known in the art, e.g. from U.S. Pat. No. 5,165,617, which is herein incorporated by reference.

Figure 10:
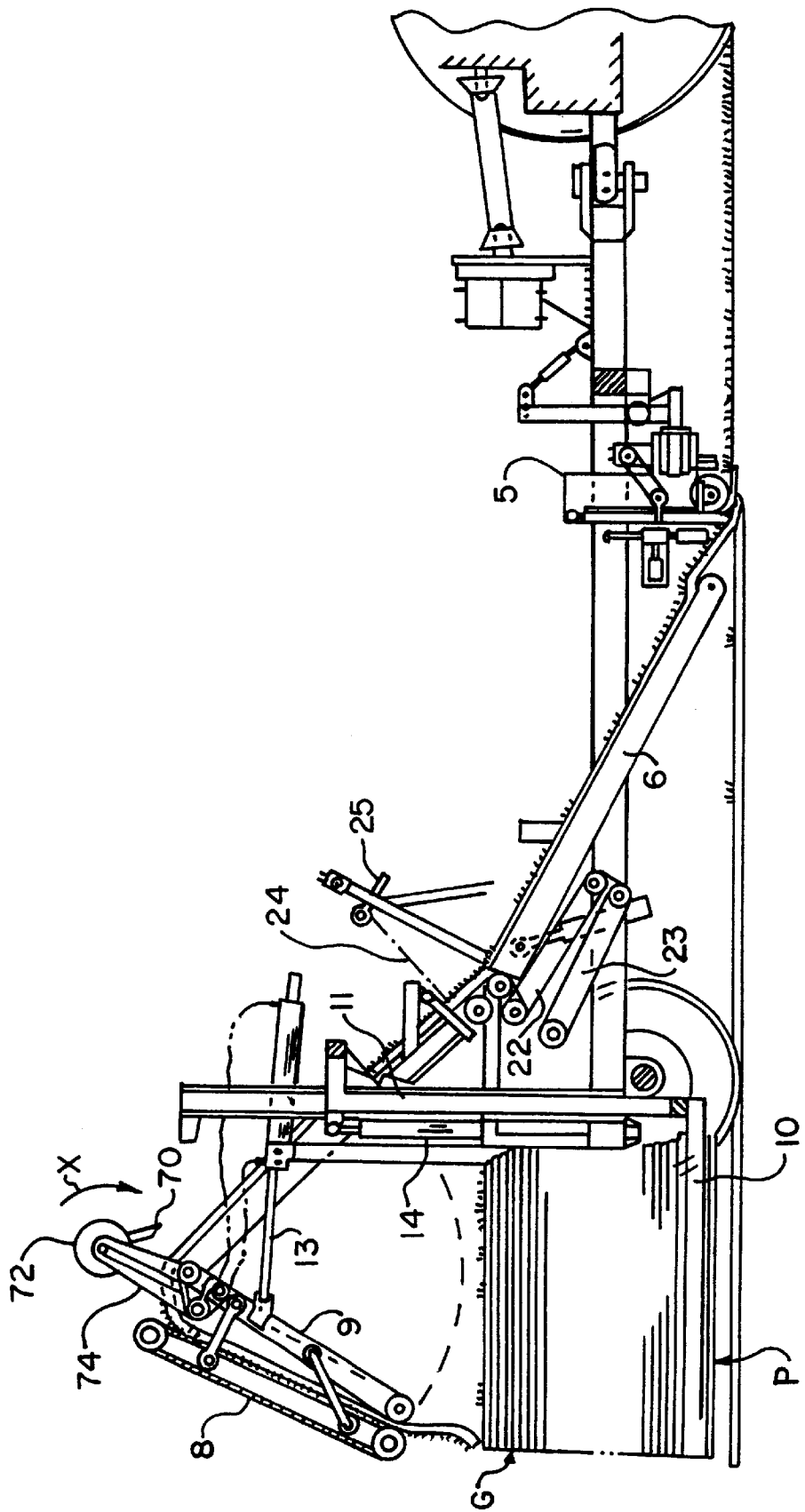
FIG. 10 is a side view of a further embodiment of the apparatus shown in FIG. 2.

As shown in FIG. 10, another apparatus within the scope of the present invention includes an additional cutting knife 70 which can be operatively connected to the drive mechanism of the conveyors 7 and 9. The additional cutting knife 70 is disposed on a roller 72 which is driven by a belt 74 connected in synchronism with the movement of the conveyors 7 and 9. As the roller 72 rotates in the direction of arrow X, the additional cutting knife 70 cuts the sod into individual pieces. Such an additional knife 70 facilitates cutting the sods in the way depicted in FIG. 8, although this could also be done with the transverse knife 56 located at the front of the cutting apparatus.

The present invention is not limited to the above embodiment described with reference to the annexed drawings. The scope of protection sought for is defined by the annexed claims.

What is claimed is:

1. A method for cutting out and stacking on a holder supported by a holder supporting means, at least one grass sod having a first part and a second part, the method comprising the steps of:

(a) moving in a first direction a reciprocating conveyor utilized to transport the at least one grass sod to the holder;

(b) placing on the holder during movement of the conveyor in the first direction the first part of the grass sod;

(c) moving the conveyor in a second direction opposite the first direction;

(d) folding the grass sod; and (e) placing on the holder during movement of the conveyor in the second direction the second part of the grass sod.

2. A method according to claim 1, wherein the grass sod is folded at least twice and the height of holder supporting means is adjusted with the placing of the grass sod on the holder.

3. A method according to claim 1, wherein the grass sod has a breadth of about 60 to 120 cm.

4. An apparatus for cutting grass sods out of grass land and for at least one of stacking and rolling the grass sods, comprising:

a frame having a plurality of wheels mounted thereon;

a cutting head carried on the frame for cutting under the grass sods;

a first conveyor mounted on the frame behind the cutting head and which repeatedly transports the grass sods from the cutting head in an upwards direction;

a second conveyor mounted on the frame behind the first conveyor; and a holder supporting means secured to the frame, wherein:
    the second conveyor comprises a fixed part and a moveable part; and
    the moveable part of the second conveyor is moveable reciprocatingly over a surface of a holder positioned on the holder supporting means.

5. An apparatus according to claim 4, having a front side and wherein the apparatus is provided with a shaft on the front side for coupling to a puller.

6. An apparatus according to claim 4, having two wheels provided with tires which are rotatably positioned on both sides of an outer side of the frame.

7. An apparatus according to claim 4, wherein a breadth of at least one of the first and second conveyors is at least about 48 inches.

8. An apparatus according to claim 4, wherein the cutting head includes at least two cutting knives arranged to move with respect to each other.

9. An apparatus for cutting grass sods out of grass land and for at least one of the stacking and rolling the grass sods, comprising:

a frame having a plurality of wheels mounted thereon;

a cutting head carried on the frame for cutting under the grass sods;

a first conveyor mounted on the frame behind the cutting head which repeatedly transports the grass sods from the cutting head in an upwards direction;

a second conveyor mounted on the frame behind the first conveyor wherein:
      the second conveyor comprises a fixed part and a moveable part; and
      the first conveyor in a first position connects onto the second conveyor and in a second position connects onto an auxiliary conveyor belonging to the first conveyor for conveying the grass sods under the second conveyor and for forming a roll of grass sods with the help of at least one of the fixed part and the moveable part of the second conveyor.

10. An apparatus according to claim 4, wherein the moveable part of the second conveyor includes a pivotable conveyor which extends downwardly and which stacks the grass sods passing therethrough in a zig-zag manner.

11. An apparatus according to claim 4, wherein the first conveyor includes at least one auxiliary conveyor for repeatedly conveying the grass sods backwards at a lower level than the second conveyor.

12. An apparatus for cutting grass sods out of grass land and for stacking to a predetermined quantity at least one grass sod, comprising:

a frame having two or more wheels;

a cutting head carried on the frame for cutting the grass sods therebeneath;

a conveyor mounted on the frame behind the cutting head for repeatedly transporting the sods upwards from the cutting head;

a holder supporting means secured to the frame; and a reciprocating member secured to an end of the conveyor and over the holder supporting means for stacking the grass sods in a to and fro movement downwards from the conveyor onto a storage holder positioned on the holder supporting means.

13. An apparatus for cutting grass sods out of grass land and stacking to a predetermined quantity the grass sods, comprising:

a frame having at least two wheels;

A cutting head carried on the frame and which is provided with a plurality of knives for cutting the grass sods beneath the cutting head;

a conveyor mounted on the frame behind the cutting head for repeatedly transporting the grass sods upwards from the cutting head, wherein the conveyor is provided with displacing means for displacing the grass sods at least one of towards and away from each other during the transporting upwards of the grass sods.

14. An apparatus for cutting grass sods out of grass land and collecting a predetermined quantity of grass sods, comprising:

a frame provided with at least two wheels suspended thereon;

a cutting head suspended in the frame and which serves for cutting the grass sods therebeneath;

a conveyor mounted on the frame behind the cutting head and which serves for repeatedly transporting the grass sods upwards from the cutting head;

a receiving device including two downwardly pointing conveyors which mutually for an acute angle therebetween, wherein in a first position, the grass sod is rolled up and wherein a second position the rolled up grass sod is unloaded onto a pallet.

15. The apparatus as claimed in claim 13, wherein the displacing means is selected form the group consisting of baffles and discs.

16. A method for cutting out and stacking grass sods having a desired breadth, the method comprising the steps of:

placing a first substantially flat part of grass sod onto a height adjustable holder therefor;

folding the grass sod;

placing a second substantially flat part of the grass sod onto the first part such that a continuously running grass sod is stacked in a zig-zag manner with the grass sod having at least two folds; and adjusting the height of the holder as the grass sod is stacked in the zig-zag manner.

\* \* \* \* \*

UNITED STATES PATENT AND TRADEMARK OFFICE
CERTIFICATE OF CORRECTION

PATENT NO. : 5,857,527
DATED : January 12, 1999
INVENTOR(S) : Johannes van Vuuren It is certified that error appears in the above-identified patent and that said Letters Patent is hereby corrected as shown below:

Claim 13 Column 8 Line 7 "A" should read --a--.

Claim 14 Column 8 Line 28 "for" should read --form--.

Claim 15 Column 8 Line 33 "form" should read --from--.

Signed and Sealed this

Eighth Day of June, 1999

Attest:

Q. TODD DICKINSON

*Attesting Officer*    Acting Commissioner of Patents and Trademarks